INVENTORS
Jack W. Schmidt,
Robert M. Tuck &
Marion D. Smith

BY
Donald F. Scherer
ATTORNEY

United States Patent Office 3,545,304
Patented Dec. 8, 1970

3,545,304
ANGLE INPUT POWER TRANSMISSION
Jack W. Schmidt, Robert M. Tuck, and Marion D. Smith, Indianapolis, Ind., assignors to General Motors Corporation, Detroit, Mich., a corporation of Delaware
Filed May 1, 1969, Ser. No. 820,829
Int. Cl. F16 57/10
U.S. Cl. 74—759
20 Claims

ABSTRACT OF THE DISCLOSURE

A power transmission having a pair of planetary gear sets which provide reduction ratios or a reduction and an overdrive ratio, a single planetary gear set drivingly connected with the pair of planetary gear sets to provide a reverse ratio, a direct drive ratio and an overdrive ratio, an output shaft adjacent the single planetary gear set coaxial with the planetary gear sets for delivering power from the transmission, and an input member non-parallel with the output shaft for delivering power to the transmission. The input shaft is disposed intermediate the ends of the transmission between the pair of planetary gear sets and the single planetary gear set. The ratios of the pair of planetary gear sets are effective in both forward and reverse drives. Thus, the transmission provides four forward speed ratios and two reverse ratios and is particularly useful with gas turbine engines.

---

Figure 1:
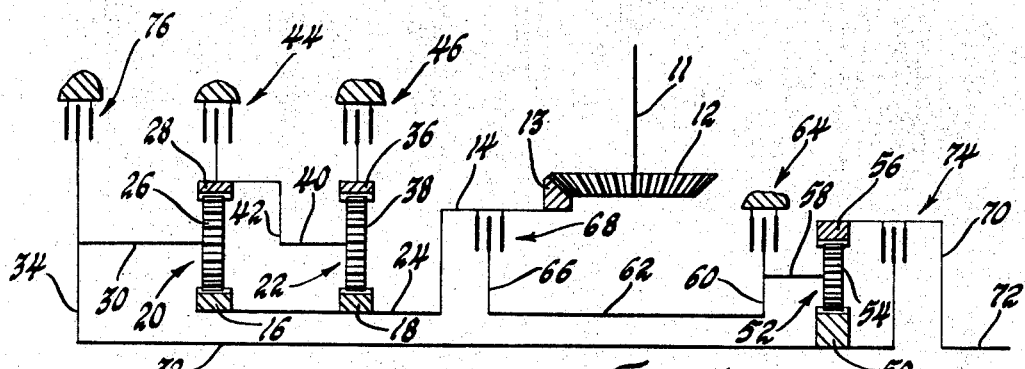

This invention relates to angle input power transmissions and more particularly to angle input power transmissions having four forward speed ratios and two reverse speed ratios.

Use of gas turbine engines is becoming feasible for heavy duty highway vehicles such as trucks. The gas turbine engine, however, has a limited efficient operating speed range and, therefore, a step ratio transmission is desirable for the wide operating range required in a highway vehicle. The stall characteristics of the gas turbine engine makes it possible to eliminate the torque converter.

There are many power train applications for highway vehicles, in which it is desirable to provide a central or angle input to the transmission. This permits the engine to be mounted parallel to the drive axle to conserve vehicle length.

The present invention provides an angle input transmission having four forward speeds and two reverse speeds which is to be used with a gas turbine engine. The transmission has a pair of planetary gear sets which are operable to provide two drive ratios. These drive ratios are combined with a forward-reverse planetary gear set which is operable to provide two forward drive ratios and one reverse drive ratio. Thus the combination of the three planetary gear sets may be used to establish four forward drives and two reverse drives. To provide a compact transmission and to fully utilize the drive ratios of the planetary gear sets, a central input shaft is used. The input shaft is disposed between the pair of planetary gear sets and the forward-reverse gear set. A bevel gear set is drivingly connected between the input shaft and the pair of planetary gear sets to provide power input thereto, and a direct clutch is selectively operatively connected between the bevel gear set and the forward-reverse planetary gear set to provide a power input thereto. The low forward and reverse ratios are sufficient to provide high starting torque when combined with the stall characteristics of the gas turbine engine. Thus a torque converter is not required.

It is, therefore, an object of this invention to provide in an improved power transmission an angle input, a pair of planetary gear sets disposed on one side of the input and a single forward-reverse planetary gear set on the other side of the input and an output shaft adjacent the forward-reverse planetary gear set.

Another object of this invention is to provide in an improved power transmission an angle input, a pair of interconnected planetary gear sets on one side of the input, having an input member driven by the angle input, and an output member, a single forward-reverse planetary gear set on the other side of the angle input having an input member clutchably connected to the angle input and an input-reaction member selectively connectable with the output member, and an output shaft adjacent and drivingly connected to the output member of forward-reverse planetary gear set.

A further object of this invention is to provide in an improved power transmission an angle input, a pair of interconnected planetary gear sets on one side of the angle input, having at least one input member continuously driven by the angle input, and an output which can be selectively driven at two speeds through the interconnected planetary or held by a brake, a single forward-reverse planetary gear set on the other side of the angle input having one input-reaction member selectively connectable to the angle input or ground, an output member drivingly connected to a transmission output shaft and a second input-reaction member drivingly connected to the output of the pair of interconnected planetary sets, and a selectively engageable clutch for connecting the second input-reaction member to the transmission output shaft.

Figure 2:
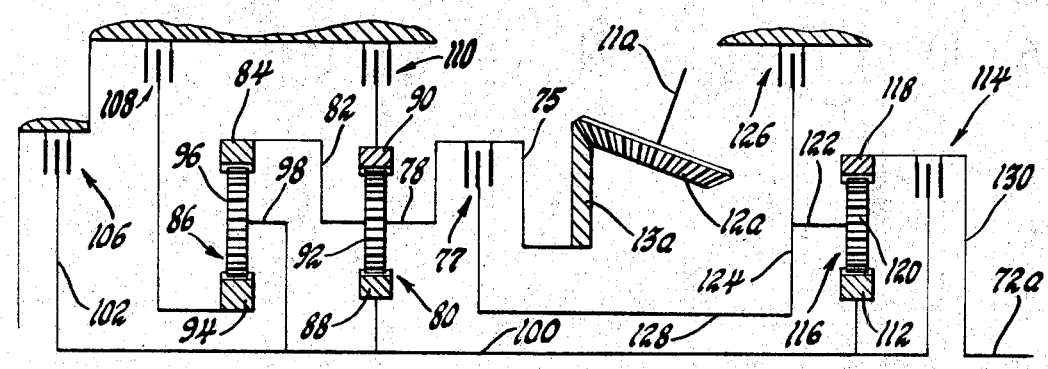
Figure 3:
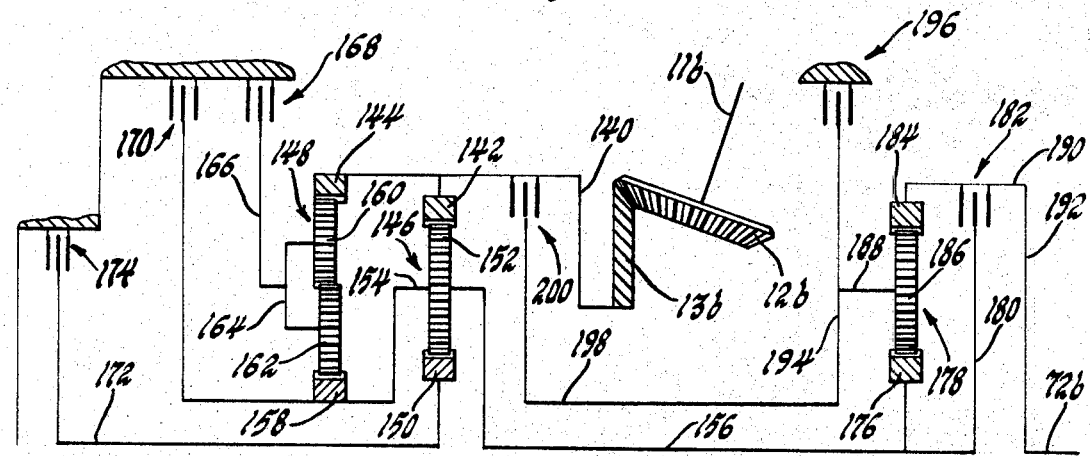

These and other objects and advantages will be more apparent from the following description and drawings in which:

FIG. 1 is a diagrammatic view of one embodiment of the invention providing one set of gear ratios, FIG. 2 is a diagrammatic view of another embodiment of the invention providing another set of gear ratios particularly useful with a governed input speed of 2,850 r.p.m., FIG. 3 is a diagrammatic view of another embodiment of the invention providing another set of gear ratios particularly useful with a governed input speed of 2,850

Figure 4:
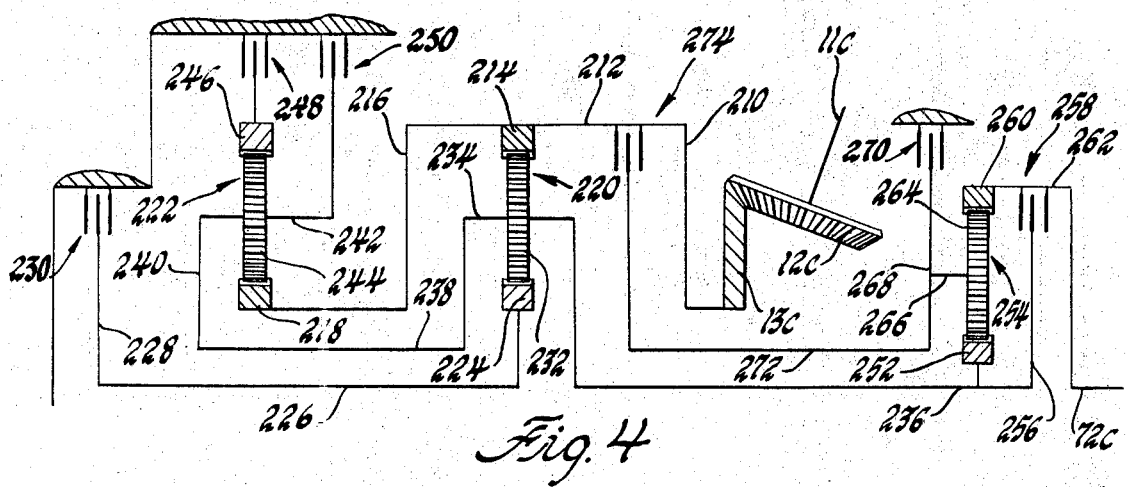
Figure 5:
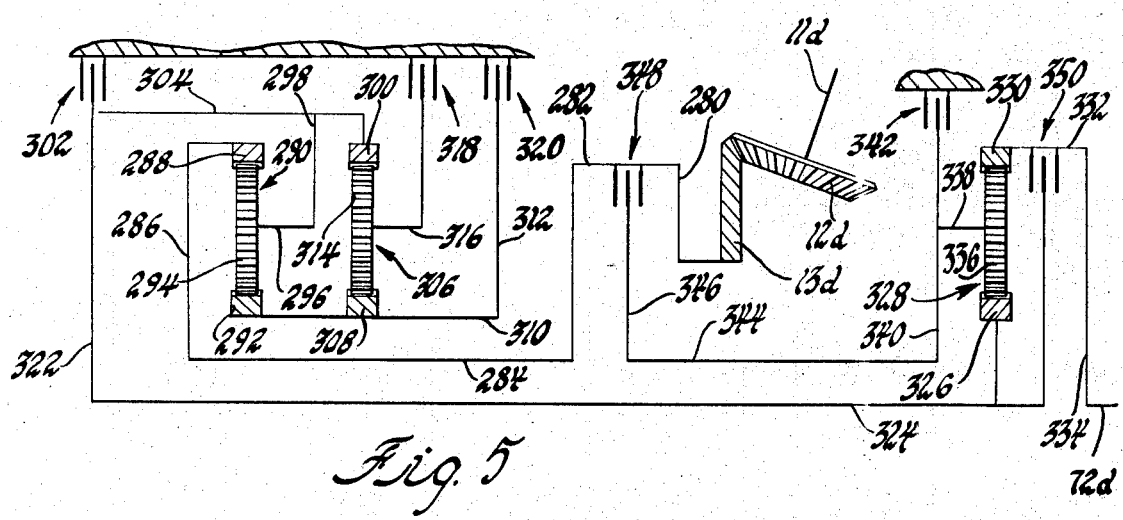

FIG. 4 is a diagrammatic view of another embodiment of the invention providing another set of gear ratios particularly useful with a governed input speed of 4,000 r.p.m., FIG. 5 is a diagrammatic view of another embodiment of the invention providing another set of gear ratios particularly useful with a governed input speed of 4,000 r.p.m.

Referring to the drawings, there is shown in FIG. 1 a power transmission having an input shaft 11 with a bevel gear 12 secured thereto. The bevel gear 12 meshes with another bevel gear 13 which is connected via hub 14 to a pair of sun gears 16 and 18 of planetary gear sets 20 and 22 respectively. The sun gears 16 and 18 are secured together and to the hub 14 by a sleeve shaft 24. The planetary set 20 has pinion gears 26 which mesh with the sun gear 16 and a ring gear 28. The pinions 26 are rotatably mounted on a carrier 30 which is drivingly connected to an intermediate shaft 32 through a hub 34. The planetary set 22 has a ring gear 36 and pinion gears 38, which mesh with the ring gear 36 and the sun gear 18 and are rotatably mounted on a carrier member 40 which is secured by a hub 42 to the ring gear 28. The ring gears 28 and 36 are connected to selectively operable brakes 44 and 46 respectively.

The intermediate shaft 32 is connected to a sun gear 50 of a forward-reverse planetary set 52 which also includes pinion gears 54 meshing with the sun gear 50 and a ring gear 56. The pinions 54 are rotatably mounted on a carrier member 58 which is connected through a hub 60 to a direct drive shaft 62. The hub 60 is also connected to a selectively operable reverse brake 64. The shaft 62 is connected by a hub 66 to a selectively operable direct drive clutch 68. The ring gear 56 is connected by a hub 70 to output shaft 72. A selectively operable lockup clutch 74 is connectable between the sun gear 50 and the ring gear 56 to provide a lockup condition in the planetary set 52 and a brake 76 is connected to the sun gear 50 by the hub 34 and intermediate shaft 32 to provide an overdrive reaction member in the forward-reverse planetary set 54.

The clutches 68 and 74 and the brakes 44, 46, 74 and 76 in FIG. 1 and the clutches and brakes shown in FIGS. 2–5 are convention disc type friction torque establishing devices. They may be controlled during engagement and disengagement hydraulically, or pneumatically, or mechanically or electrically in any of the known conventional methods.

For operation in neutral, in all of the FIGS. 1–5, the first gear or low brake is engaged. To condition the transmission for first gear forward, the lockup clutch 74 and the brake 44 are engaged thus directing the drive from input shaft 11 through sun gear 16, pinions 26, carrier 30, intermediate shaft 32, and clutch 74 to the output shaft 72 in planetary gear set 20 and a one-to-one ratio in planetary gear set 52. For second gear operation, the brake 44 is disengaged and the brake 46 is engaged thus providing a compound induction ratio in planetary gear sets 20 and 22 and a one-to-one ratio in planetary gear set 52. The drive is from input shaft 11 through the bevel gear set 12–13 to the sun gears 16 and 18 and through pinions 38 and carrier 40 to the ring gear 28 where the drives are combined in the pinions 26 and delivered via carrier 30, intermediate shaft 32, and lockup clutch 74 to the output shaft 72. To condition the transmission for third gear operation, the brake 46 is disengaged and the clutch 68 is engaged, thus directing the drive from the input shaft 11 through the bevel gear set, clutch 68, direct drive shaft 62 and carrier 58 through the planetary set 52 which is in a one-to-one ratio condition and then to the output shaft 72. To condition the transmission for fourth gear forward, the lockup clutch 74 is disengaged and the brake 76 is engaged to provide an overdrive ratio in planetary gear set 52. Thus the drive is directed from input shaft 11 through the bevel gear set, the clutch 68 and the intermediate shaft 62 to the carrier 58. Since the sun gear 50 is held from rotation by the brake 76, the ring gear 56 is overdriven due to the planetary action and thus drives the output shaft 72 at a speed greater than the direct drive shaft 62. The number of teeth on the bevel gears 12 and 13 can be selected to provide a one-to-one drive, a reduction drive or a drive less than one-to-one depending on the particular installation.

First gear reverse is established by engaging brakes 44 and 64, thus providing a drive from the input shaft 11 through planetary gear set 20 in a manner similar to first gear forward and then reversely through the forward-reverse planetary gear set 52 to the output shaft 72. Second gear reverse is established by disengaging brake 44 and engaging brake 46. The drive thus established is from the input shaft 11 to the intermediate shaft 32 in a manner similar to second gear forward, and then reversely through the forward-reverse planetary gear set 52 to the output shaft 72.

The following chart shows the friction drive establishing devices which are engaged and the gear ratios that are obtained for the various drive ratios of the transmission shown in FIG. 1, and the step ratio between successive forward gear ratios.

| Drive ratio | Friction drive establishing devices engaged | Typical gear ratio | Typical step ratio |
|---|---|---|---|
| Foward: | | | |
| First | 44 and 74 | 3.00 | |
| | | | 1.66 |
| Second | 46 and 74 | 1.80 | |
| | | | 1.80 |
| Third | 68 and 74 | 1.00 | |
| | | | 1.45 |
| Fourth | 68 and 76 | .69 | |
| Neutral | 44 | | |
| Reverse: | | | |
| First | 44 and 64 | −6.72 | |
| Second | 46 and 64 | −4.04 | |

The power transmission shown in FIG. 2 has an input shaft 11a secured to an input bevel gear 12a which meshes with an output bevel gear 13a. The bevel gear 13a is connected via hub 75 to a clutch 77 and a carrier 78 which is part of a planetary set 80 and via hub 82 to a ring gear 84 which is a part of a planetary set 86. The planetary set 80 also includes a sun gear 88 and a ring gear 90 which mesh with pinion gears 92, rotatably mounted on the carrier 78.

A planetary set 86 includes a sun gear 94 and pinion gears 96 which mesh with the ring gear 84 and the sun gear 94 and are rotatably mounted on a carrier 98. Both the carrier 98 and the sun gear 88 are drivingly connected to an intermediate shaft 100 which is connected via a hub 102 to a selectively operable overdrive brake 106. The sun gear 94 and the ring gear 90 are drivingly connected to selectively operable brakes 108 and 110 respectively.

The intermediate shaft 100 is drivingly connected to a sun gear 112 and to a selectively operable lockup clutch 114. The sun gear 112 is a component of the forward-reverse planetary set 116 which also includes a ring gear 118 and pinion gears 120 which mesh with the sun gear 112 and the ring gear 118 and are rotatably mounted on a carrier 122 which is connected by a hub 124 to a reverse brake 126 and a direct drive shaft 128. The direct drive shaft 128 is connected to the direct drive clutch 77. The ring gear 118 is connected by a hub 130 to the output shaft 72a.

To establish first gear forward, the lockup clutch 114 is engaged and the brake 108 is engaged thus establishing a reduction ratio in planetary gear set 86 and a one-to-one ratio in planetary gear set 116. The drive path is from the input 11a through the bevel gear set 12a–13a to the ring gear 84 then through the pinions 96 to the carrier 98, intermediate shaft 100, lockup clutch 114 to the output shaft 72a. To establish second gear, the brake 108 is disengaged and the direct clutch 77 is engaged thus providing a direct drive from the input shaft 11a through the bevel gear set, the clutch 77, the shaft 128, the planetary set 116 which is in a one-to-one ratio condition, to the output shaft 72a. To establish a third speed forward, the brake 106 is engaged while the clutch 114 is disengaged thus establishing an overdrive ratio in planetary gear set 116. The drive is from the input shaft 11a through the bevel gear set, the clutch 77 and the shaft 128 to the carrier 122. Since the sun gear 112 is held from rotation by the brake 106, the ring gear 118 and the output shaft 72a are overdriven. To establish fourth gear forward, the brake 106 and clutch 77 are disengaged while the brake 110 and clutch 114 are engaged thus establishing an overdrive ratio in the planetary gear set 80 and a one-to-one ratio in the planetary gear set 116. The drive is from the input shaft 11a through the bevel gear set to the carrier 78. With the ring gear 90 held from rotation, the sun gear 88 is overdriven as is the output shaft 72a which is connected thereto by shaft 100 and the rear planetary set 116 which is locked up by the clutch 114.

To establish first gear reverse drive, the brakes 108 and 126 are engaged thus providing a drive from the input shaft 11a through the bevel gear set, the ring gear 84, the carrier 98 and the intermediate shaft 100 to the sun gear 112. Since the carrier 126 is held from rotation, the ring gear 118 and output shaft 72a are driven in reverse. To establish second gear reverse, the brake 108 is disengaged while the brake 110 is engaged thus providing a drive from the input shaft 11a through the bevel gear set, to the carrier 78 which drives the sun gear 88, intermediate shaft 100 and sun gear 112 forward. Since the carrier 122 is held from rotation by the brake 126, the ring gear 118 and output shaft 72a are driven in reverse.

The following chart shows the friction drive establishing devices which are engaged and the gear ratios, including the bevel gear ratio, that are obtained for the various drive ratios of the transmission shown in FIG. 2, and the step ratio between successive forward gear ratios.

| Drive ratio | Friction drive establishing devices engaged | Typical gear ratio | Typical step ratio |
| --- | --- | --- | --- |
| Forward: | | | |
| First | 108 and 114 | 2.86 | |
| | | | 1.60 |
| Second | 77 and 114 | 1.79 | |
| | | | 1.60 |
| Third | 77 and 106 | 1.12 | |
| | | | 1.67 |
| Fourth | 110 and 114 | 0.67 | |
| Neutral | 108 | | |
| Reverse: | | | |
| First | 108 and 126 | −4.77 | |
| Second | 110 and 126 | −1.12 | |

The gearing arrangement shown in FIG. 3 has an input shaft 11b which is drivingly connected to a bevel gear 12b which meshes with another bevel gear 13b. The bevel gear 13b is connected via a hub 140 to a pair of ring gears 142 and 144 which are compenents of planetary gear sets 146 and 148 respectively. The planetary gear set 146 also includes a sun gear 150 and a pinion gear 152 rotatably mounted on a carrier 154 and meshing with the sun gear 150 and the ring gear 142. The carrier 154 is connected to an intermediate shaft 156 and to a sun gear 158 of the planetary set 148.

The planetary set 148 also includes a pair of pinion gears 160 and 162 which are intermeshing and mesh with the ring gear 144 and the sun gear 158 respectively. The pinions are rotatably mounted on a carrier 164 which is connected by a hub 166 to a selectively operable brake 168. The sun gear 158 and carrier 154 are also connected to a selectively operable brake 170. The sun gear 150 of planetary gear set 146 is connected via a hub 172 to a selectively operable brake 174.

The intermediate shaft 156 is drivingly connected to a sun gear 176 of a forward-reverse planetary gear set 178 and by a hub 180 to a selectively operable lockup clutch 182. The planetary set 178 also includes a ring gear 184 and a pinion gear 186 which is rotatably mounted on a carrier 188 and meshes with the sun gear 176 and the ring gear 184. The ring gear 184 is connected by a drum 190 and a hub 192 to an output shaft 72b. The clutch 182 is also connected to drum 190. The carrier 188 is connected via a hub 194 to a selectively operable reverse brake 196 and via a direct drive shaft 198 to a selectively engageable direct clutch 200 which is connected to the hub 140.

To establish first gear forward, the brake 174 and the clutch 182 are engaged thus establishing a reduction ratio in planetary gear set 146 and one-to-one ratio in planetary gear set 178. The drive is from the input shaft 11b through the bevel gear set and the hub 140 to the planetary set 146 which provides a reduction drive via a carrier 154 to the intermediate shaft 156 which is connected via the clutch 182 to the output shaft 72b. To establish second gear forward, the brake 174 is disengaged while the clutch 200 is engaged thus establishing the direct drive from the input shaft 11b to the clutch 200 to shaft 198, planetary gear sets 178 to the output shaft 72b. To establish third gear forward, the clutch 182 is disengaged and the brake 170 is engaged thus establishing an overdrive ratio in the planetary gear set 178. The drive is from the input shaft 11b through the bevel gear set to the clutch 200, the intermediate shaft 198, the carrier 188, and the ring gear 184 to output shaft 72b. To establish fourth gear forward, the brake 170 and clutch 200 are disengaged while the brake 168 and clutch 182 are engaged thus establishing the carrier 164 as a reaction member to the planetary gear sets 148 so that an overdrive ratio is present from the ring gear 144 to the sun gear 158. The drive is from the input shaft 11b through the bevel gear set to the hub 140, the ring gear 144, the sun gear 158, intermediate shaft 156, and lockup clutch 182 to the output shaft 72b.

To establish first gear reverse, the brakes 174 and 196 are engaged thus establishing the sun gear 150 as a reaction member in planetary set 146 and the carrier 188 in planetary set 178 as a reaction member so that drive is from the input shaft 11b through the bevel gear set, the hub 140, the planetary set 146 to the intermediate shaft 156 and reversely through the forward-reverse planetary sets 178 to the output shaft 72b. To establish second gear reverse, the brake 174 is disengaged and the brake 168 is engaged thus establishing a drive through the planetary set 148 to the intermediate shaft 156 and reversely through the forward-reverse planetary set 178 to the output shaft 72b.

The following chart shows the friction drive establishing which are engaged and the gear ratios, including the bevel gear reduction, that are obtained for the various drive ratios of the transmission shown in FIG. 3, and the step ratio between successive forward gear ratios.

| Drive ratio | Friction drive establishing devices engaged | Typical gear ratio | Typical step ratio |
| --- | --- | --- | --- |
| Forward: | | | |
| First | 174 and 182 | 3.03 | |
| | | | 1.45 |
| Second | 200 and 182 | 2.095 | |
| | | | 1.45 |
| Third | 200 and 170 | 1.45 | |
| | | | 1.55 |
| Fourth | 168 and 182 | .935 | |
| Neutral | 174 | | |
| Reverse: | | | |
| First | 174 and 196 | −6.79 | |
| Second | 168 and 196 | −2.095 | |

The gearing arrangement shown in FIG. 4 has an input shaft 11c drivingly connected to a bevel gear 12c which meshes with another bevel gear 13c which is connected via a hub 210 and drum 212 to a ring gear 214 and via a hub 216 to a sun gear 218. The ring gear 214 and the sun gear 218 are components respectively of planetary sets 220 and 222. Also included in planetary set 220 is a sun gear 224 which is connected via a shaft 226 and a hub 228 to a selectively operable brake 230, and pinion gear 232 which is rotatably mounted on a carrier 234 and meshes with the sun gear 224 and the ring gear 214. The carrier 234 is connected to an intermediate shaft 236 and another shaft 238 which is connected via a hub 240 to a carrier 242 of the planetary set 222. Also included in the planetary set 222 is a pinion gear 244 rotatably mounted on the carrier 242 and meshing with the sun gear 218 and with a ring gear 246. The ring gear 246 and carrier 242 are drivingly connected to selectively operable brakes 248 and 250 respectively. The intermediate shaft 236 is connected to a sun gear 252 which is a component of the forward-reverse planetary set 254 and via a hub 256 to a selectively operable lockup clutch 258. Also included in the planetary set 254 is a ring gear 260 which is connected via hub 262 to the output shaft 72c, and pinion gears 264 which are rotatably mounted on a carrier 266 and mesh with the sun gear 252 and the ring gear 260. The carrier 266 is connected to a hub 268 which is connected to a selectively operable reverse brake 270 and to a direct drive shaft 272 which is connected to a selectively operable direct clutch 274 which is also connected to the drum 212.

To establish first gear forward drive, the brake 248 and the clutch 258 are engaged. The drive is thus established from the input shaft 11c through bevel gear set to the drum 274, the hub 216, and the planetary set 222, which provides a reduction ratio, to the intermediate shaft 236 and through the lockup clutch 258 to the output shaft 72c. To establish second gear forward, a brake 248 is disengaged while a brake 230 is engaged thus establishing a drive from the input shaft 11c to the bevel gear set, the drum 274, and the planetary set 220, which provides a reduction ratio, to the intermediate shaft 236 and then through the clutch 258 to the output shaft 72c. To esablish third gear forward, the direct clutch 274 is engaged while the brake 230 is disengaged thus establishing a direct drive from the input shaft 11c to the bevel gear set, the clutch 274, and the forward reverse planetary gear set 254, which provides a one-to-one ratio, to the output shaft 72c. To establish fourth gear forward, the clutch 258 is disengaged while the brake 250 is engaged thus establishing the sun gear 252 of the forward reverse planetary set 254 as a reaction member. The drive thus establishes from the input shaft 11c through the hub 210, the clutch 274, shaft 272 to the carrier 266 and then through the planetary set 254, which provides an overdrive ratio, to the output shaft 72c.

To establish first gear reverse, the brake 248 and brake 270 are engaged. The drive thus provided is from the input shaft 11c through the bevel gear set, the drum 212, and the planetary gear set 222 to the intermediate shaft 236 and then reversely through the forward-reverse planetary set 254 to the output shaft 72c. To establish second gear reverse, the brake 230 is engaged while the brake 248 is disengaged. The drive thus establishes from the input shaft 11c through the bevel gear set, hub 210, drum 212, planetary gear sets 220 to the intermediate shaft 236 and then reversely through the forward-reverse planetary set 254 to the output shaft 11c.

The following chart shows the friction drive establishing devices which are engaged and the gear ratios, including the bevel gear reduction, that are obtained for the various drive ratios of the transmission shown in FIG. 4, and the step ratio between successive forward gear ratios.

| Drive ratio | Friction drive establishing devices engaged | Typical gear ratio | Typical step ratio |
|---|---|---|---|
| Forward: | | | |
| First | 248 and 258 | 5.09 | |
| | | | 1.84 |
| Second | 230 and 258 | 2.76 | |
| | | | 1.45 |
| Third | 274 and 258 | 1.91 | |
| | | | 1.45 |
| Fourth | 250 and 274 | 1.32 | |
| Neutral | 248 | | |
| Reverse: | | | |
| First | 248 and 270 | −11.4 | |
| Second | 230 and 270 | −6.19 | |

The gearing arrangement shown in FIG. 5 includes input shaft 11d drivingly connected to a bevel gear 12d, which meshes with another bevel gear 13d which is drivingly connected to a hub 280 which is connected to a drum 282 which is connected to a shaft 284. The shaft 284 is connected via hub 286 to a ring gear 288 which is a component of a planetary gear set 290. Also included in the planetary gear set 290 is a sun gear 292 and a planet pinion 294 which meshes with the sun gear 292 and ring gear 288 and is rotatably mounted on a carirer 296 which is connected via a hub 298 to a ring gear 300 and a selectively operable brake 302 via a hub 304. The ring gear 300 is a component of the planetary gear set 306 which also includes a sun gear 308 connected via shaft 310 to the sun gear 292 and to a hub 312 and planet pinions 314 which mesh with the sun gear 308 and the ring gear 300 and are rotatably mounted on a carrier 316 which is connected to a selectively operable brake 318. The sun gears 292 and 308 are connected by the shaft 310 and hub 312 to a selectively operable brake 320. The drum 304 is also connected bia hub 322 to an intermediate shaft 324 which is connected to a sun gear 326 of the forward-reverse planetary set 328 and to a lockup clutch 350. The forward-reverse planetary set 328 also includes the ring gear 330 which is connected via a drum 332 and hub 334 to the output shaft 72d and a pinion gear 336 which meshes with the sun gear 326 and the ring gear 330 and is rotatably mounted on a carrier 338 which is drivingly connected to a hub 340. The hub 340 is connected to a selectively operable reverse brake 342 and to a direct drive shaft 344 which is connected via hub 346 to a selectively operable direct clutch 348. The direct clutch 348 is also connected to the drum 282.

To establish first gear, the brake 318 and the clutch 350 are engaged to establish a compound reduction ratio in the planetary gear sets 290 and 306 and a one-to-one ratio in the planetary gear set 328. The drive thus produced is from the input shaft 11d through the bevel gear set, the drum 282, and shaft 284, to the ring gear 288 and then through the planetary sets 290 and 306 to the intermediate shaft 324 and then via the lockup clutch 350 to the output shaft 72d. Second gear forward is estabilshed by disengaging brake 318 while engaging brake 320 to establish a reduction ratio in the planetary gear set 290. The drive is from the input shaft 11d to the gear 288 in a manner similar to first gear and then through the planetary set 290 to the intermediate shaft 324 and then through the lockup clutch 350 to the output shaft 72d. To establish third gear forward, the brake 320 is disengaged while the clutch 348 is engaged thus providing a direct drive from the input shaft 11d to the output shaft 72d via clutches 348, planetary set 328 and clutch 350. To establish fourth gear forward, the clutch 350 disengaged while the brake 302 is engaged to provide an overdrive ratio in the planetary gear set 328. The drive is from the input shaft 11d through the bevel gear set, the clutch 348, and shaft 344 to the carrier 338 and then through the planetary gear set 328 to the output shaft 72d.

To establish first gear reverse, the brake 318 and the brake 342 are engaged thus establishing a drive from the input shaft 11d through the bevel gear set, hub 280, drum 282, shaft 284, and planetary sets 290 and 306 to the intermediate shaft 324 and then reversely through the planetary set 328 to the output shaft 72d. Second gear reverse is established by engaging brake 320 while disengaging brake 318 thus establishing a drive from the input shaft 11d through the bevel gear sets, hub 280, drum 282, shaft 284, and planetary set 290 to the intermediate shaft 324 and then reversely through the planetary set 328 to the output shaft 72d.

The following chart shows the friction drive establishing devices which are engaged and the gear ratios, including the bevel gear reduction, that are obtained for the various drive ratios of the transmission shown in FIG. 5, and the step ratio between successive forward gear ratios.

| Drive ratio | Friction drive establishing devices engaged | Typical gear ratio | Typical step ratio |
|---|---|---|---|
| Forward: | | | |
| First | 318 and 350 | 4.45 | |
| | | | 1.56 |
| Second | 320 and 350 | 2.86 | |
| | | | 1.50 |
| Third | 348 and 350 | 1.91 | |
| | | | 1.45 |
| Fourth | 348 and 302 | 1.32 | |
| Neutral | 318 | | |
| Reverse: | | | |
| First | 318 and 342 | −9.96 | |
| Second | 320 and 342 | −6.41 | |

The foregoing description and drawings are not intended as limitations of the invention since obvious modifications will be apparent to those skilled in the art.

What is claimed is:

1. A power transmission including an input shaft; bevel gear means drivingly connected to said input shaft; an output shaft extending transversely with respect to said input shaft; a pair of planetary gear means operatively connected to said bevel gear means on one side of said input shaft coaxially aligned with said output shaft, for establishing a pair of drive ratios other than one-to-one each of said planetary gear means having a plurality of rotatable members, including a pair of selectively operable drive establishing devices for establishing said pair of drive ratios; forward-reverse planetary gear means drivingly connected to and coaxially aligned with said output shaft on the other side of said input shaft for providing a reverse drive ratio, a one-to-one drive ratio and a forward overdrive ratio including a plurality of members; lockup clutch means for selectively establishing said one-to-one ratio, direct clutch means for selectively connecting said forward-reverse planetary gear means with said bevel gear means, and selectively operable reverse brake means for establishing said reverse drive ratio; intermediate shaft means operatively connecting said pair of planetary gear means with said forward-reverse planetary gear means; and selectively operable overdrive brake means operatively connected with said intermediate shaft means for establishing said overdrive ratio in said forward-reverse planetary gear means.

2. The invention defined in claim 1 and said direct clutch means and said reverse brake means each being connectable with one member of the forward-reverse planetary gears means, and said lockup clutch being connectable between two other members of the forward-reverse planetary gear means.

3. The invention defined in claim 1 and said intermediate shaft means being operatively connected with one member in each of said pair of planetary gear means and with said lockup clutch means.

4. The invention defined in claim 1 and the pair of drive ratios established by said pair of planetary gear means being reduction drive ratio operable in conjunction with said forward-reverse planetary gear means to provide both drive ratios in forward and reverse.

5. The invention defined in claim 1 and one of the pair of drive ratios established by said pair of planetary gear means being an underdrive ratio and the other being an overdrive ratio.

6. A power transmission including an input shaft; bevel gear means drivingly connected to said input shaft; an output shaft skewed with respect to said input shaft; a pair of planetary gear means operatively connected to said bevel gear means on one side of said input shaft coaxially aligned with said output shaft, for establishing a pair of drive ratios other than one-to-one each having two central gear members, pinion members meshing with the central gear members, a carrier member and a pair of selectively operable drive establishing means operatively connected with said members for establishing said pair of drive ratios; forward-reverse planetary gear means drivingly connected to and coaxially aligned with said output shaft on the other side of said input shaft for providing a reverse drive ratio, a one-to-one drive ratio and a forward overdrive ratio including a pair of central gear elements, a pinion element meshing with the central gear elements, and a carrier element; lockup clutch means operatively connected with two of said elements for selectively establishing said one-to-one ratio; direct clutch means operatively connected with one of said elements for selectively connecting said forward-reverse planetary gear means with said bevel gear means; selectively operable reverse brake means operatively connected with one of said elements for establishing said reverse drive ratio; intermediate shaft means operatively connecting said pair of planetary gear means with said forward-reverse planetary gear means; and selectively operable overdrive brake means operatively connected with said intermediate shaft means for establishing said overdrive ratio in said forward-reverse planetary gear means.

7. The invention defined in claim 6 and said direct clutch means and said reverse brake means each being connectable with the carrier element of the forward-reverse planetary gear means, and said lockup clutch being connectable between the central gear elements of the forward-reverse planetary gear means.

8. The invention defined in claim 6 and said intermediate shaft means being operatively connected with one carrier member of said pair of planetary gear means and with said lockup clutch means.

9. The invention defined in claim 6 and the pair of drive ratios established by said pair of planetary gear means being reduction drive ratio operable in conjunction with said forward-reverse planetary gear means to provide both drive ratios in forward and reverse.

10. The invention defined in claim 6 and one of the pair of drive ratios established by said pair of planetary gear means being an underdrive ratio and the other being an overdrive ratio.

11. The invention defined in claim 6 and said intermediate shaft means being operatively connected with said carrier member of one of said pair of planetary gear means and with one of said central gear members of the other of said pair of planetary gear means and with one of said lockup clutch means.

12. The invention defined in claim 6 and said bevel gear means being continuously drivingly connected to a central gear member of one of the pair of planetary gear means.

13. The invention defined in claim 6 and said bevel gear means being continuously drivingly connected to a central gear member of each of said pair of planetary gear means.

14. A power transmission including an input shaft; bevel gear means drivingly connected to said input shaft; an output shaft extending transversely with respect to said input shaft; a pair of planetary gear means operatively connected to said bevel gear means on one side of said input shaft coaxially aligned with said output shaft, for establishing a pair of drive ratios other than one-to-one each having a sun gear, a ring gear, a pinion gear meshing with the sun and ring gear, a carrier member rotatably supporting said pinion gear and a pair of selectively operable drive establishing means operatively connected with said gears for establishing said pair of drive ratios; forward-reverse planetary gear means drivingly connected to and coaxially aligned with said output shaft on the other side of said input shaft for providing a reverse drive ratio, a one-to-one forward drive ratio and a forward overdrive ratio including a sun gear element, a ring gear, a pinion gear element meshing with the sun and ring gear elements, and a carrier element rotatably supporting said pinion gear element; selectively operable lockup clutch means operatively connected with said sun and ring gear elements for selectively establishing said one-to-one forward ratio; selectively operable direct clutch means operatively connected with said carrier element for selectively connecting said forward-reverse planetary gear means with said bevel gear means; and selectively operable reverse brake means operatively connected with said carrier element for establishing said reverse drive ratio; intermediate shaft means operatively connecting said pair of planetary gear means with said forward-reverse planetary gear means; and selectively operable overdrive brake means operatively connected with said intermediate shaft means for establishing said overdrive ratio in said forward-reverse planetary gear means.

15. The invention defined in claim 14 and said intermediate shaft means being operatively connected with a carrier member of said pair of planetary gear means and with said lockup clutch means.

16. The invention defined in claim 14 and the pair of drive ratios established by said pair of planetary gear means being reduction drive ratio operable in conjunction with said forward-reverse planetary gear means to provide both drive ratios in forward and reverse.

17. The invention defined in claim 14 and one of the pair of drive ratios established by said pair of planetary gear means being an underdrive ratio and the other being an overdrive ratio.

18. The invention defined in claim 14 and said intermediate shaft means being operatively connected with said carrier member of one of said pair of planetary gear means and with said sun gear of the other of said pair of planetary gear means and with one of said lockup clutch means.

19. The invention defined in claim 14 and said bevel gear means being continuously drivingly connected to a sun gear member of one of the pair of planetary gear means.

20. The invention defined in claim 14 and said bevel gear means being continuously drivingly connected to one of said sun gear and ring gear of each of said pair of planetary gear means.

References Cited

UNITED STATES PATENTS

| | | | |
|---|---|---|---|
| 3,039,326 | 6/1962 | Christenson | 74—688 |
| 3,080,772 | 3/1963 | Foerster | 74—688 |
| 3,270,586 | 9/1966 | Tuck et al. | 74—688 X |
| 3,371,557 | 3/1968 | Lammert | 74—688 X |
| 3,396,606 | 8/1968 | Tuck | 74—688 X |

ARTHUR T. McKEON, Primary Examiner

U.S. Cl. X.R.

74—763